US 6,561,014 B1

(12) United States Patent
Smith et al.

(10) Patent No.: US 6,561,014 B1
(45) Date of Patent: May 13, 2003

(54) ALTITUDE SIMULATOR FOR DYNAMOMETER TESTING

(75) Inventors: James Craig Smith, Farmington Hills, MI (US); Peter James Maloney, New Hudson, MI (US); Matt Osterhout, Northstreet, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/694,078

(22) Filed: Oct. 20, 2000

(51) Int. Cl.[7] ............................................. G01M 15/00
(52) U.S. Cl. ...................................................... 73/117.1
(58) Field of Search ............................... 73/117.1, 116, 73/117, 112, 117.2, 117.3, 118.1, 118.2, 865.6

(56) References Cited

U.S. PATENT DOCUMENTS

| | | | | |
|---|---|---|---|---|
| 4,964,298 A | * | 10/1990 | Matsushita | 73/117.1 |
| 5,167,146 A | * | 12/1992 | Hostetter | 73/117.1 |
| 5,592,372 A | * | 1/1997 | Artail et al. | 700/73 |

* cited by examiner

Primary Examiner—Eric S. McCall
(74) Attorney, Agent, or Firm—Vincent A. Cichosz (57) ABSTRACT

A method and apparatus for conducting dynamometric testing of an internal combustion engine at a test site under a simulated atmospheric pressure that differs substantially from an actual ambient atmospheric pressure existing at the test site. The internal combustion engine has an air inlet for supplying an intake airflow for combustion within the internal combustion engine and an exhaust outlet for exhausting an exhaust flow exiting from the internal combustion engine. The method includes the steps of subjecting the air inlet to the simulated atmospheric pressure, subjecting the exhaust outlet to the simulated atmospheric pressure and operating the internal combustion engine while both of the air inlet and the exhaust outlet are subjected to the simulated atmospheric pressure. The apparatus includes an exhaust pressure controller for maintaining the exhaust outlet of the internal combustion engine substantially equal to a determined exhaust pressure during operation of the internal combustion engine and an intake pressure controller for maintaining the air inlet of the internal combustion engine substantially equal to a determined intake pressure during operation of the internal combustion engine.

22 Claims, 3 Drawing Sheets

ALTITUDE SIMULATOR FOR DYNAMOMETER TESTING

FIELD OF THE INVENTION

The present invention generally relates to a method and apparatus used to test the operational performance (i.e., for dynamometric testing) of an internal combustion engine under various ambient atmospheric pressures, thereby simulating operation of the engine at various altitudes. More particularly, the invention pertains to a method and apparatus that allow dynamometric testing of an internal combustion engine at various ambient atmospheric pressures, without requiring that the entire engine be enclosed within a barometric chamber of controlled pressure.

BACKGROUND OF THE INVENTION

The following background information is provided to assist the reader in understanding the invention described and claimed herein. Accordingly, any terms used herein are not intended to be limited to any particular narrow interpretation, unless specifically so indicated.

The manufacturers of modern vehicles powered by an internal combustion engine subject the vehicles to various testing procedures. One such testing procedure that is typically performed is "dynamometric testing", which involves running the engine under actual or simulated likely-to-be encountered conditions, while simultaneously testing and measuring various parameters.

In one sense, an internal combustion engine can be viewed as an air pump that also produces rotational power. Accordingly, the characteristics and performance of an internal combustion engine can be significantly altered by a change in the ambient atmospheric pressure at which the engine is operated. For example, according to Boyle's Law, air density varies directly with respect to atmospheric pressure and inversely with respect to atmospheric temperature, i.e., $\rho$(air density)=P/RT. Whereas a typical ambient atmospheric pressure at sea level is on the order of 100 kPa (i.e., kilopascals), a typical ambient atmospheric pressure in the location of Denver, Colo., U.S.A. is typically on the order of 80 kPa, or about 20% less that at sea level. With other factors remaining equal (e.g., ambient temperature and humidity), this results in an engine "at altitude" (e.g., in Denver) receiving a 20% less charge of oxygen with each intake stroke, given the same engine speed, throttle angle, EGR percentage, etc. Additionally, the internal combustion engines of most modern vehicles adjust, usually by software, the fuel delivery based on the ambient atmospheric pressure, sometimes directly measured, but usually estimated from other measured parameters. Accordingly, at altitude, the maximum power output of the engine can be significantly reduced.

Increasingly, the operation of a modern internal combustion engine vehicle is controlled by microprocessor software. Apart from the reduced maximum power output at altitude, there are a substantial number of factors in the vehicle's software that are influenced by the ambient atmospheric pressure. For all of these reasons, it has been customary for vehicle manufacturers to dynamometrically (i.e., operationally) test their engines under conditions of varying atmospheric pressure. One manner in which vehicles have been traditionally tested under reduced atmospheric pressures is to actually operate the vehicles at altitude, e.g., in Denver, up Pike's Peak, etc. For more preliminary testing, manufacturers have also used so-called "dynamometric chambers". Such dynamometric chambers are closed barometric cells in which a lower than ambient pressure can be maintained. The engine is dynamometrically tested (run under various operating loads, conditions, etc.) within the chamber.

However, such dynamometric chambers can be expensive to build, operate and maintain. Since a rather large pressure differential must be maintained across the boundaries of the pressure cell, a dynamometric chamber is similar to a diving bell, requiring substantial and expensive structural support.

OBJECTIVES OF THE INVENTION

Accordingly, one objective of the present invention is the provision of a method and apparatus for the dynamometric testing of an internal combustion engine under varying ambient atmospheric pressures without requiring the building, operation or maintenance of a cumbersome and expensive barometric cell.

Another objective of the invention is the provision of a method and apparatus for the dynamometric testing of an internal combustion engine under varying ambient atmospheric pressures that is relatively inexpensive in construction and reliable in operation.

Yet another objective of the present invention is the provision of a method and apparatus for the dynamometric testing of an internal combustion engine under varying ambient atmospheric pressures which is, on the whole, safer than previously used barometric chambers, since pressures are controlled only across the inlet and output interfaces of the engine system, as opposed to over the entire surface of a dynamometric chamber. Therefore, the overall pressure-induced forces acting on the control surfaces are considerably reduced.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the drawings and claims presented herein.

SUMMARY OF THE INVENTION

The foregoing objectives and advantages are attained by the various embodiments of the invention summarized below.

In one aspect, the invention generally features a method for conducting dynamometric testing of an internal combustion engine at a test site under a simulated atmospheric pressure that differs substantially from an actual ambient atmospheric pressure existing at the test site. The internal combustion engine has an air inlet for supplying an intake airflow for combustion within the internal combustion engine and an exhaust outlet for exhausting an exhaust flow exiting from the internal combustion engine. The method includes the steps of subjecting the air inlet to the simulated atmospheric pressure, subjecting the exhaust outlet to the simulated atmospheric pressure and operating the internal combustion engine while both of the air inlet and the exhaust outlet are subjected to the simulated atmospheric pressure.

In another aspect, the invention generally features an altitude simulator for dynamometer testing for conducting dynamometric testing of an internal combustion engine at a test site under a simulated atmospheric pressure that differs substantially from an actual ambient atmospheric pressure existing at the test site. The internal combustion engine has an air inlet for supplying an intake airflow for combustion within the internal combustion engine and an exhaust outlet for exhausting an exhaust flow exiting from the internal combustion engine. The altitude simulator for dynamometer testing includes an exhaust pressure controller for maintaining the exhaust outlet of the internal combustion engine substantially equal to a determined exhaust pressure during operation of the internal combustion engine and an intake pressure controller for maintaining the air inlet of the internal combustion engine substantially equal to a determined intake pressure during operation of the internal combustion engine.

DETAILED DESCRIPTION OF THE PREFERRED EMBODIMENTS

Figure 1:
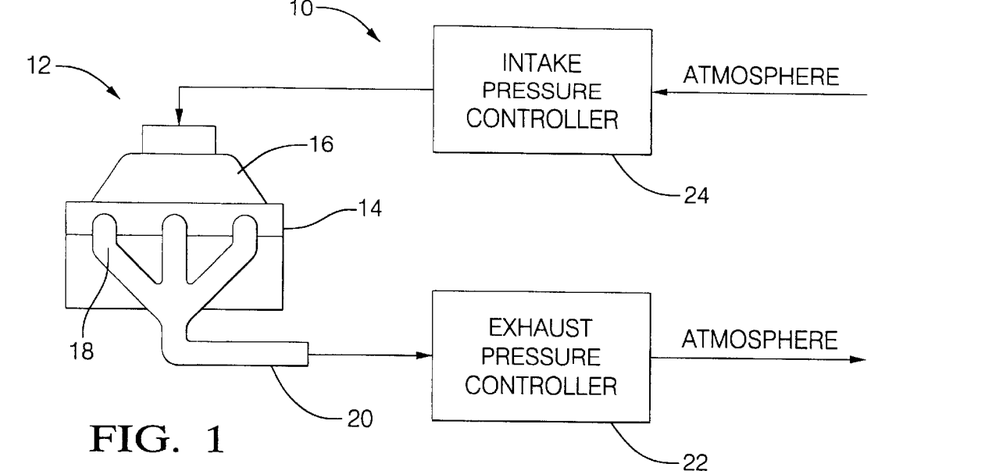
FIG. 1 is an overall diagrammatic view of an altitude simulator for dynamometer testing constructed according to the invention.

Referring initially to FIG. 1, an altitude simulator for dynamometer testing, constructed according to the present invention, is generally indicated by reference numeral 10. The altitude simulator 10 is, in FIG. 1, shown connected to an internal combustion engine system 12, which includes an internal combustion engine 14, an air intake system 16 for supplying the engine system 12 with a flow of air for supporting the combustion of fuel therein, and an exhaust system 18 for exhausting the products of combustion therefrom. Commonly, the air intake system 16 will include such components as an air cleaner/filter, a carburetion system, an intake manifold, etc. Typically, the exhaust system 18 will include such components as an exhaust manifold, a catalytic converter unit, and various exhaust pipes and connections terminating in a tailpipe 20.

In contrast to the previously utilized dynamometric chamber approach to altitude simulation, the present invention recognizes that, since the only parts of an internal combustion engine that are affected by barometric pressure are the air inlet and the exhaust outlet of the engine, only these relatively small volumes need be pressure controlled in order to subject the operational characteristics of the engine as a whole to changes in ambient pressure (thereby simulating changes in altitude).

The altitude simulator 10 itself generally includes a exhaust pressure controller 22 and an intake pressure controller 24, each of which is shown in more detail in FIGS. 2 and 3, respectively, and described more fully below.

In FIG. 1, the intake pressure controller 24 is shown as being connected upstream of the air intake system 16, and the exhaust pressure controller 22 is shown as being connected downstream of the tailpipe 20. It will be understood by those of ordinary skill in the art that the precise points at which the air intake pressure controller 24 and the exhaust pressure controller 22 are connected to the engine system 12 are not of primary concern. The primary consideration is rather that the air inlet through which intake air is introduced into the engine system 12 and the exhaust outlet and through which exhaust gases are exhausted from the engine system 12 be maintained at the desired pressure.

Figure 2:
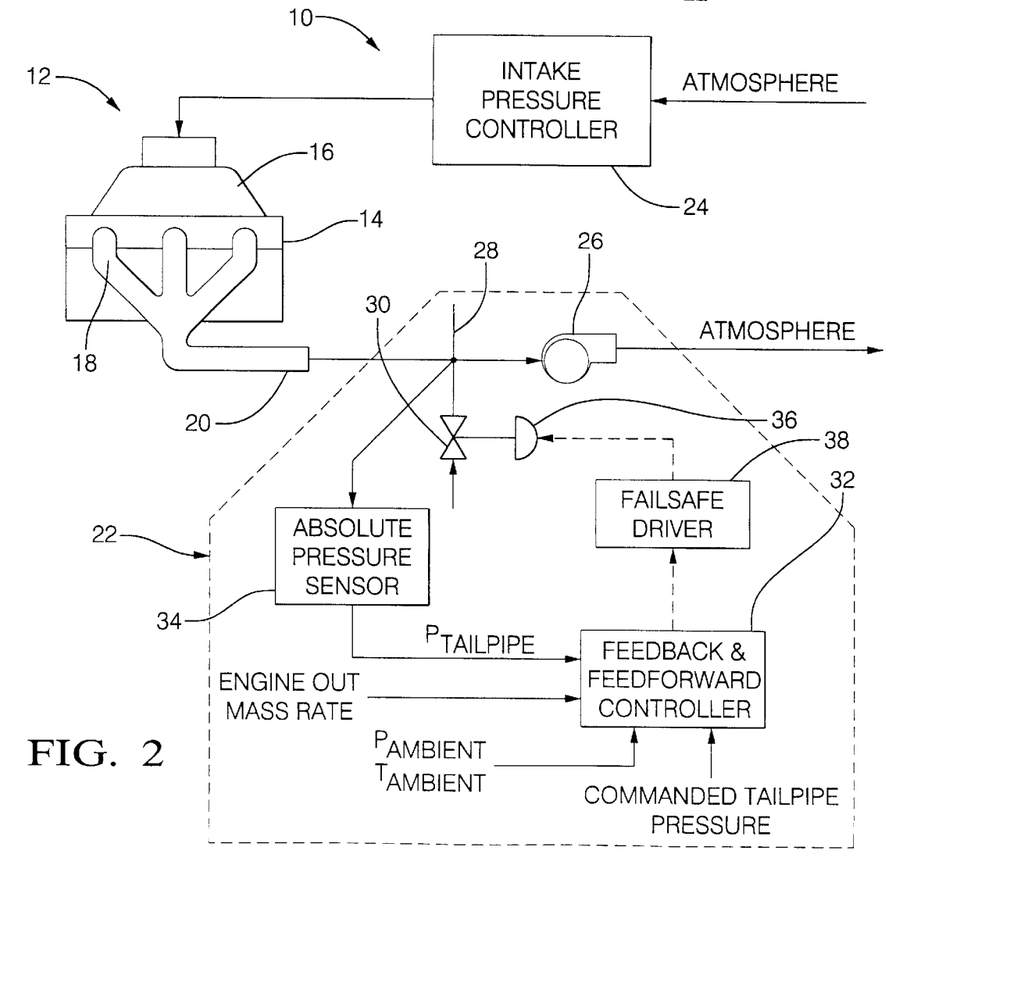
FIG. 2 is a diagrammatic view of an exhaust pressure controller unit of the altitude simulator for dynamometer testing of FIG. 1.

Referring now to FIG. 2, the exhaust pressure controller 22 includes an exhaust pump 26, which is connected to the exhaust outlet of the engine system 12. In the presently preferred embodiment, as shown in FIGS. 1 and 2, the exhaust pump 26 is connected to the tailpipe 20, which functions as the exhaust outlet of the engine system 12. The exhaust pump 26 is chosen to have a capacity (i.e., in cubic feet per minute, etc.) sufficient to produce an absolute pressure at the exhaust outlet (e.g., the tailpipe 20) of the engine system 12 which is at least as low as, and preferably lower than, the absolute pressure at which the dynamometric testing is to be carried out, during such time as the engine system 12 is running, and over the entire range of operation of the engine system 12. For example, as noted above, an absolute pressure of 80 kPa is typically used for dynamometric testing to represent a common absolute ambient atmospheric pressure likely to be encountered in Denver, Colo. Assuming that the actual atmospheric pressure at the testing site is on the order of 100 kPa, then the capacity of the exhaust pump 26 must be sufficient to pull at least a negative pressure of 20 kPa, in order to reach the desired 80 kPa representative of the Denver, Colo. ambient atmospheric pressure. Additionally, the exhaust pump 26 must be of sufficient capacity to maintain this negative pressure differential (e.g., 20 kPa) throughout the entire operating range over which the engine system 12 is tested. For example, maintaining a given negative pressure differential (e.g., 20 kPa) will require a greater flow capacity for exhaust pump 26 if the tested operating range of the engine system 12 is to include operation at full throttle (i.e., with the throttle wide open) as opposed to operation only at lower engine speeds and light loads.

In actual operational tests, a diesel particulate exhaust pump has been employed for the exhaust pump 26. Such a diesel particulate exhaust pump is used in the testing of diesel engines and, since it is utilized to maintain the particulate matter produced by diesel engines (e.g., soot) airborne, a diesel particulate exhaust pump has a substantially high flow capacity and the ability to pull a substantial negative pressure. It is estimated, for example, that such a diesel particulate pump was able to pull a negative pressure of 25 kPa over the entire dynamometrically tested range of a typical 4-cylinder passenger vehicle engine.

The exhaust pump 26 is connected to exhaust the effluent from the exhaust outlet of the internal combustion engine system 12 (i.e., the tailpipe 20) and therefore, in effect, creates a barometric control surface 28 at the terminus of the exhaust outlet of the internal combustion engine system 12 (i.e., at the outlet end of the tailpipe 20). In the present invention, the barometric control surface 28 extends only over the exhaust outlet of the internal combustion engine 12. This is in contrast to the prior art approaches, wherein a barometric control surface extending over the entire engine had to be established and maintained. Since the exhaust pump 26, as explained above, will pull a higher than desired negative pressure throughout the range of testing, air at the ambient atmospheric pressure is admitted from the test site to raise the pressure at the barometric control surface 28 (i.e., the outlet of the tailpipe 20) to the desired simulated atmospheric pressure. To this end, the exhaust pressure controller 22 includes an inlet valve 30 for admitting air at ambient atmospheric pressure from the test site to a point which is preferably located substantially adjacent the barometric control surface 28.

The opening and closing of the inlet valve 30 is controlled by a Feedback and Feed Forward Controller 32, which is preferably provided in the form of a numerical processor, such as, for example, a microprocessor. The Feedback and Feed Forward Controller 32 is provided with a variable input of the "Commanded Tailpipe Pressure" and also receives a data signal indicative of the absolute pressure existing at the barometric control surface, namely, $P_{Tailpipe}$ which is generated by an absolute pressure sensor 34 positioned preferably to read the pressure at a point substantially adjacent the barometric control surface 28. If $P_{Tailpipe}$ is less than the Commanded Tailpipe Pressure, the Feedback and Feed Forward Controller 32 controls the inlet valve 30 so as to admit ambient air from the test site to a point substantially adjacent the barometric control surface 28 and thereby raise the pressure at the barometric control surface 28 to the desired level.

The Feedback and Feed Forward Controller 32 controls the inlet valve 30 through a valve actuator 36. Preferably, the valve actuator 36 includes a failsafe driver 38. Such valve actuators incorporating a failsafe driver are available commercially and are well known to those of ordinary skill in the art in the field of the invention. The failsafe driver 38 may be built into the valve actuator 36 but can be a standalone device. The failsafe driver 38 is, in fact, a controller for the valve actuator 36. The failsafe driver 38 can be programmed to act as a simple (or local) feedback controller for the valve actuator 36 and can also accommodate external commands to drive the valve actuator 36 through this local controller. The failsafe driver 38 can produce a 2–10 mA signal that is typical of such industrial applications. The 2–10 mA signal commands the valve actuator 36, which in turn positions the larger intake valve 30.

The Feedback and Feed Forward Controller 32 may optionally be furnished with additional variable input signals, including "Engine Mass Rate Out", "$P_{Ambient}$" and "$T_{Ambient}$". As is well understood in the field, the inclusion of these additional variables allows the engine intake mass rate to be calculated. By using this additional information, the feed forward section of the Feedback and Feed Forward Controller 32 can be made more effective. This is most useful for dynamic testing, where the speed and the loading conditions of the engine system 12 are changing during testing. In steady state testing, use of these additional variables is not critical. Use of the additional variables Engine Mass Rate Out, $P_{Ambient}$ and $T_{Ambient}$ allows the control command to be instantly changed when the operating conditions of the engine system 12 change, using feed forward on these variables, together with a dynamic physical model of the system at hand. This is in contrast to using just feedback and having to wait for control errors to arise before the control command is changed. This feed forward approach is important in non-linear applications and in applications that can vary over a wide range of such non-linearities, which is the case of an engine's air intake over the span of normal operating conditions.

Figure 3:
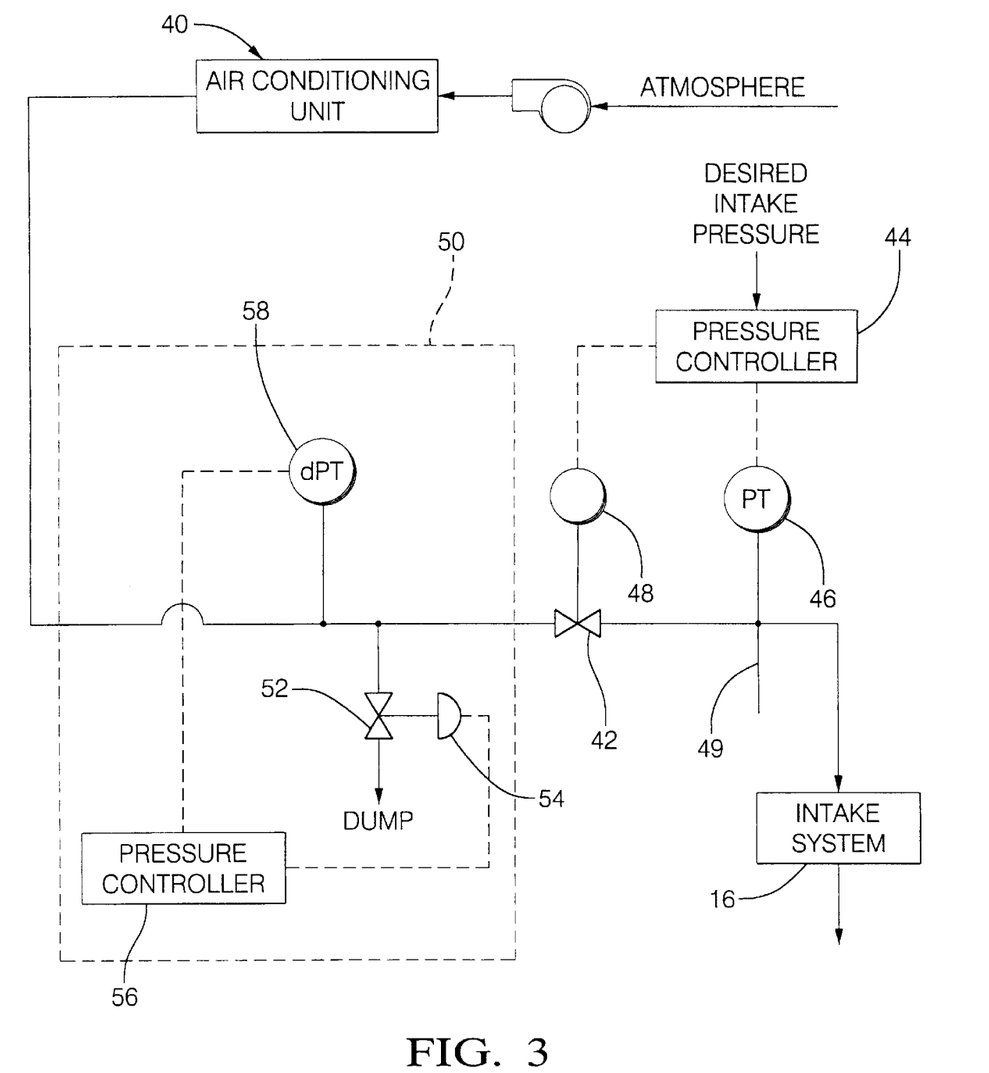
FIG. 3 is a diagrammatic view of an air intake pressure controller of the altitude simulator for dynamometer testing of FIG. 1.

Referring now most particularly to FIG. 3, the intake pressure controller 24 includes an air conditioning unit 40, described more fully below in connection with FIG. 4, which supplies a sufficient flow of conditioned air at a predetermined pressure, humidity and temperature to exceed what the engine system 12 might consume at the upper limit of dynamometric testing. In order to reduce the pressure at which this conditioned air is supplied to the engine system 12, a choke valve 42 is positioned downstream of the air conditioning unit 40 and upstream of the air inlet of the engine system 12. Whereas, in the exhaust pressure controller 22, the exhaust pump 26 is employed to draw down the pressure to below the ambient pressure existing at the test site, here, the engine system 12 itself acts as an air pump. The choke valve 42 positioned between the air conditioning unit 40 and the air inlet of the engine system 12 provides a resistance against which the engine system 12 can produce the required pressure drop.

The degree of closure of the choke valve 42 is controlled by a first pressure controller 44, which is also preferably provided in the form of a numerical processor (e.g., a microprocessor). The first pressure controller 44 is provided with a Desired Intake Pressure variable and a signal generated by a pressure transducer 46. The pressure transducer 46 is preferably mounted just upstream of the air inlet of the engine system 12 (e.g., just ahead of the air cleaner thereof). The first pressure controller 44 manipulates the choke valve 42 (through an actuator 48 associated with the choke valve 42) so as to maintain the pressure registered by the pressure transducer 46 within acceptable limits of the Desired Intake Pressure.

Another barometric control surface 49 is established at the intake system 16 of the engine system 12. Again, in contrast to the prior art approach, the barometric control surface 49 extends only over the air inlet of the engine system 12 and not over the entire extent of the engine system 12.

The effectiveness of the choke valve 42 is increased if the pressure drop across the choke valve 42 is maintained within a certain range. If the pressure differential across the choke valve 42 is too small, the choke valve 42 becomes, to some degree, ineffective. If, on the other hand, the pressure differential across the choke valve 42 is too great, the choke valve 42 becomes too sensitive, in that small changes in the configuration of the choke valve 42 produce very large changes in downstream pressure. Accordingly, in order to maintain the pressure just upstream of the choke valve 42 within this desired range, the intake pressure controller 24 is preferably provided with a pressure dump mechanism 50, which generally includes a dump valve 52, an actuator 54 for actuating the dump valve 52, a second pressure controller 56 and a differential pressure transducer 58, which is mounted across the choke valve 42. The second pressure controller 56 receives a signal from the differential pressure transducer 58 indicating the pressure existing across the choke valve 42 and signals the actuator 54 to actuate the dump valve 52 so as to maintain this pressure within a range wherein, preferably, the effectiveness of the choke valve 42 will be maximized. Provision of the pressure dump mechanism 50 additionally prevents the ductwork connecting the air conditioning unit 40 to the remainder of the system from being exposed to excessive pressure forces.

Figure 4:
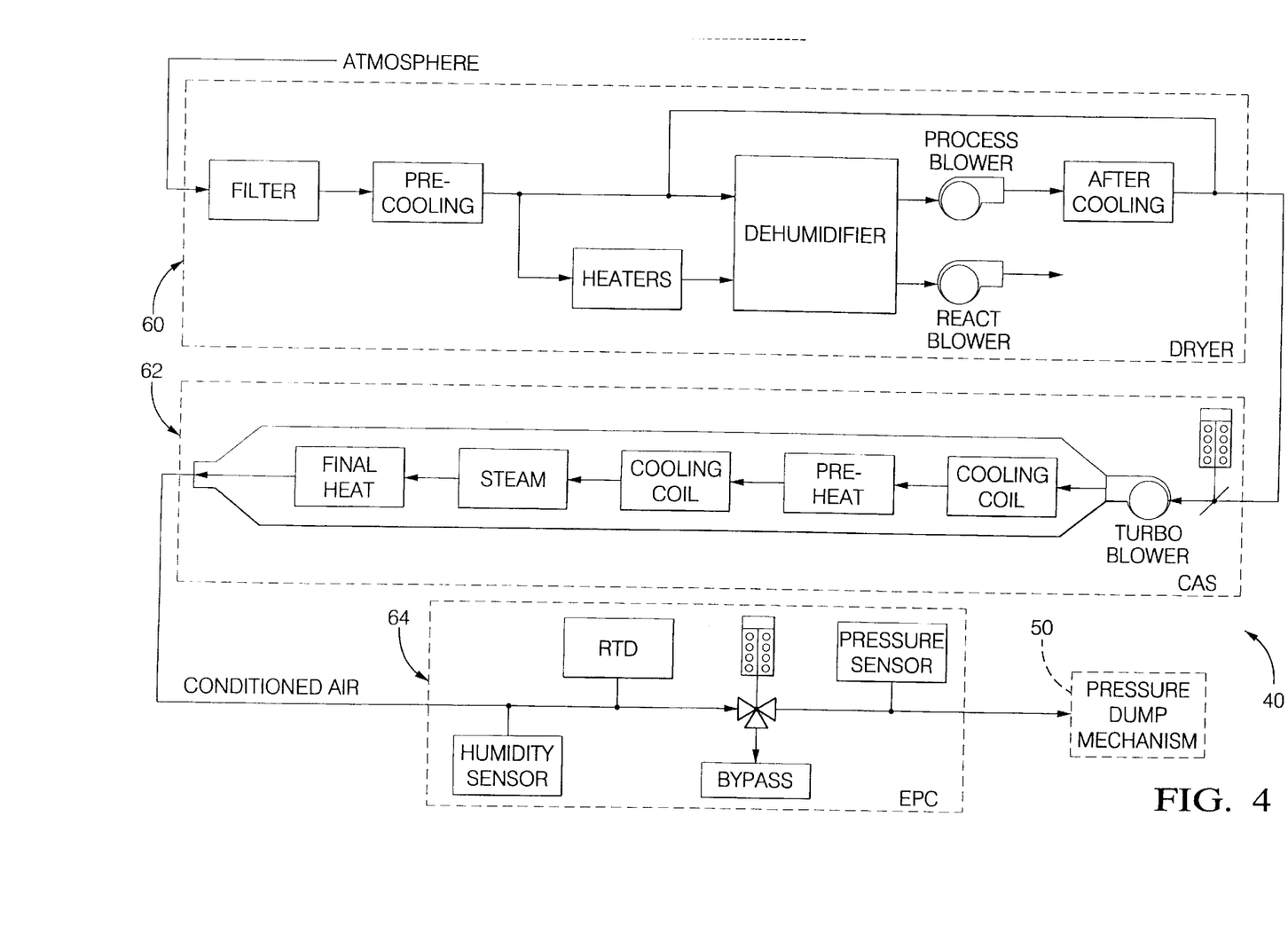
FIG. 4 is a diagrammatic view of an air conditioning unit used in the air intake pressure controller of FIG. 3.

Referring primarily now to FIG. 4, the air conditioning unit 40, shown there in more detail, generally includes a dryer stage 60 for dehumidifying the air intake into the unit, a conditioned air supply stage 62 for adjusting the temperature and humidity of the air and a final electronic pressure control stage 64. Air conditioning units such as are shown in FIGS. 3 and 4 and which are used in the practice of the present invention are available as off the shelf units from commercial vendors, as is well understood by the average artisans in the field to which the present invention pertains.

The Feedback and Feed Forward Controller 32 of FIG. 2 and the first and second pressure controllers 44 and 54, respectively, of FIG. 3 may be all be implemented within a single microprocessor configuration, or the different controllers can be each implemented within a separate microprocessor, as desired.

While the present invention has been disclosed by way of a description of a particularly preferred embodiment or a number of particularly preferred embodiments, it will be readily apparent to those of ordinary skill in the art that various substitutions of equivalents can be effected without departing from either the spirit or scope of the invention as set forth in the appended claims.

What is claimed is:

1. A method for conducting dynamometric testing of an internal combustion engine at a test site under a simulated atmospheric pressure that differs substantially from an actual ambient atmospheric pressure existing at said test site, said internal combustion engine having an air inlet for supplying an intake airflow for combustion within said internal combustion engine and an exhaust outlet for exhausting an exhaust flow exiting from said internal combustion engine, said method comprising the steps of:

A) subjecting said air inlet of said internal combustion engine to said simulated atmospheric pressure;

B) subjecting said exhaust outlet of said internal combustion engine to said simulated atmospheric pressure, comprising:

connecting an exhaust pump to said exhaust outlet;

measuring an exhaust pressure by positioning a pressure sensor at a location substantially adjacent said exhaust outlet;

operating said exhaust pump to exhaust said exhaust flow exiting from said internal combustion engine to said test site and to reduce the exhaust pressure measured by said pressure sensor to a pressure at least as low as said simulated atmospheric pressure;

operating said exhaust pump to exhaust, from said exhaust outlet, a flow substantially exceeding said exhaust flow exiting from said internal combustion engine while simultaneously;

admitting air at said actual ambient atmospheric pressure from said test site to said location substantially adjacent said exhaust outlet, said air admitted from said test site to said location substantially adjacent said exhaust outlet being sufficient to maintain said exhaust pressure substantially equal to said simulated atmospheric pressure, comprising the steps of:

providing an exhaust pressure controller;

providing a controllable inlet valve for admitting air at said actual ambient atmospheric pressure from said test site to said location substantially adjacent said exhaust outlet, said controllable inlet valve being controlled by said exhaust pressure controller;

providing signals from said pressure sensor positioned substantially adjacent said exhaust outlet to said exhaust pressure controller; and controlling said controllable inlet valve with said exhaust pressure controller such that said exhaust pressure is maintained substantially equal to said simulated atmospheric pressure; and C) operating said internal combustion engine while both of said air inlet and said exhaust outlet are subjected to said simulated atmospheric pressure;

wherein said simulated atmospheric pressure is substantially lower than said actual simulated atmospheric pressure existing at said test site; and wherein said exhaust pump has a capacity sufficient to reduce said pressure existing at said exhaust outlet to a pressure at least as low as said simulated atmospheric pressure over substantially an entire range of operating conditions of said internal combustion engine encountered during said step C).

2. A method for conducting dynamometric testing of an internal combustion engine at a test site under a simulated atmospheric pressure, according to claim 1, wherein:

said pressure sensor positioned substantially adjacent said exhaust outlet comprises an absolute pressure sensor.

3. A method for conducting dynamometric testing of an internal combustion engine at a test site under a simulated atmospheric pressure, according to claim 1, said method further comprising the additional step of:

providing a failsafe driver for actuating said controllable inlet valve.

4. A method for conducting dynamometric testing of an internal combustion engine at a test site under a simulated atmospheric pressure, according to claim 1, wherein said exhaust pump comprises a diesel particulate exhaust pump.

5. A method for conducting dynamometric testing of an internal combustion engine at a test site under a simulated atmospheric pressure that differs substantially from an actual ambient atmospheric pressure existing at said test site, said internal combustion engine having an air inlet for supplying an intake airflow for combustion within said internal combustion engine and an exhaust outlet for exhausting an exhaust flow exiting from said internal combustion engine, said method comprising the steps of:

A) subjecting said air inlet of said internal combustion engine to said simulated atmospheric pressure, comprising:

providing a flow of air from said test site to said air inlet of said internal combustion engine, providing a controllable variable choke valve for substantially restricting said flow of air from said test site to said air inlet of said internal combustion engine, disposing a pressure sensor substantially adjacent said air inlet of said internal combustion engine;

measuring an intake pressure substantially adjacent said air inlet of said internal combustion engine with said pressure sensor, providing an intake pressure controller;

providing signals generated by said pressure sensor disposed substantially adjacent said air inlet of said internal combustion engine to said intake pressure controller; and controlling said controllable variable choke valve with said intake pressure controller such that said pressure measured by said pressure sensor disposed substantially adjacent said air inlet of said internal combustion engine is maintained substantially equal to said simulated atmospheric pressure;

B) subjecting said exhaust outlet of said internal combustion engine to said simulated atmospheric pressure, C) operating said internal combustion engine while both of said air inlet and said exhaust outlet are subjected to said simulated atmospheric pressure.

6. A method for conducting dynamometric testing of an internal combustion engine at a test site under a simulated atmospheric pressure that differs substantially from an actual ambient atmospheric pressure existing at said test site, said internal combustion engine having an air inlet for supplying an intake airflow for combustion within said internal combustion engine and an exhaust outlet for exhausting an exhaust flow exiting from said internal combustion engine, said method comprising the steps of:

A) subjecting said air inlet of said internal combustion engine to said simulated atmospheric pressure, comprising:

providing a flow of air from said test site to said air inlet of said internal combustion engine, comprising the additional step of
    providing an air conditioning unit for supplying a conditioned airflow to said air inlet of said internal combustion engine;
    providing a controllable variable choke valve for substantially restricting said flow of air from said test site to said air inlet of said internal combustion engine,
    measuring an intake pressure substantially adjacent said air inlet of said internal combustion engine,
    controlling said controllable variable choke valve to maintain said intake pressure substantially equal to said simulated atmospheric pressure; and
    providing a pressure dump mechanism between said air conditioning unit and said controllable variable choke valve;
    said pressure dump mechanism being operable to maintain a pressure upstream of said controllable variable choke valve within a determined pressure range;
B) subjecting said exhaust outlet of said internal combustion engine to said simulated atmospheric pressure,
C) operating said internal combustion engine while both of said air inlet and said exhaust outlet are subjected to said simulated atmospheric pressure.

7. A method for conducting dynamometric testing of an internal combustion engine at a test site under a simulated atmospheric pressure, according to claim 6, wherein said pressure dump mechanism comprises:
    a dump pressure sensor for sensing a pressure upstream of said controllable variable choke valve and for generating a dump pressure signal indicative thereof;
    a dump valve for dumping pressure from said conditioned airflow to said test site; and
    a processor for receiving said dump pressure signal generated by said dump pressure sensor and for controlling said dump valve to maintain said pressure upstream of said controllable variable choke valve within said determined pressure range.

8. An altitude simulator for dynamometer testing for conducting dynamometric testing of an internal combustion engine at a test site under a simulated atmospheric pressure that differs substantially from an actual ambient atmospheric pressure existing at said test site, said internal combustion engine having an air inlet for supplying an intake airflow for combustion within said internal combustion engine and an exhaust outlet for exhausting an exhaust flow exiting from said internal combustion engine, said altitude simulator for dynamometer testing comprising:
    an exhaust pressure controller for maintaining said exhaust outlet of said internal combustion engine substantially equal to a determined exhaust pressure during operation of said internal combustion engine, comprising
        an exhaust pump connected to said exhaust outlet of said internal combustion engine for exhausting said exhaust flow exiting from said internal combustion engine to said test site and for reducing an exhaust pressure existing substantially adjacent said exhaust outlet to a pressure at least as low as said simulated atmospheric pressure;
        a pressure sensor positioned substantially adjacent said exhaust outlet;
        a controllable inlet valve for admitting air at said actual ambient atmospheric pressure from said test site to a location substantially adjacent said exhaust outlet; and
        a processor for receiving signals from said pressure sensor indicative of a pressure substantially adjacent said exhaust outlet and for controlling said controllable inlet valve to maintain said exhaust pressure substantially equal to said simulated atmospheric pressure; and
    an intake pressure controller for maintaining said air inlet of said internal combustion engine substantially equal to a determined intake pressure during operation of said internal combustion engine;
    wherein said determined exhaust pressure and said determined intake pressure are both substantially equal to said simulated atmospheric pressure; and
    wherein said simulated atmospheric pressure is substantially lower than said actual ambient atmospheric pressure existing at said test site.

9. An altitude simulator for dynamometer testing, according to claim 8, wherein said pressure sensor comprises an absolute pressure sensor.

10. An altitude simulator for dynamometer testing, according to claim 8, wherein said exhaust pressure controller additionally includes:
    a failsafe driver for actuating said controllable inlet valve.

11. An altitude simulator for dynamometer testing, according to claim 8, wherein said exhaust pump comprises a diesel particulate exhaust pump.

12. An altitude simulator for dynamometer testing for conducting dynamometric testing of an internal combustion engine at a test site under a simulated atmospheric pressure that differs substantially from an actual ambient atmospheric pressure existing at said test site, said internal combustion engine having an air inlet for supplying an intake airflow for combustion within said internal combustion engine and an exhaust outlet for exhausting an exhaust flow exiting from said internal combustion engine, said altitude simulator for dynamometer testing comprising:
    an exhaust pressure controller for maintaining said exhaust outlet of said internal combustion engine substantially equal to a determined exhaust pressure during operation of said internal combustion engine, and
    an intake pressure controller for maintaining said air inlet of said internal combustion engine substantially equal to a determined intake pressure during operation of said internal combustion engine, comprising
        a controllable variable choke valve for substantially restricting a flow of air from said test site to said air inlet of said internal combustion engine;
        an air conditioning unit for supplying a conditioned airflow from said test site to said air inlet of said internal combustion engine; and
        a pressure dump mechanism operationally connected between said air conditioning unit and said controllable variable choke valve;
    said pressure dump mechanism being operable to maintain a pressure upstream of said controllable variable choke valve within a determined pressure range.

13. An altitude simulator for dynamometer testing, according to claim 12, wherein said intake pressure controller additionally includes:
    a pressure sensor for measuring an intake pressure substantially adjacent said air inlet of said internal combustion engine; and
    a first processor for receiving a pressure signal generated by said pressure sensor and indicative of said intake pressure and for controlling said controllable variable choke valve to maintain said intake pressure measure by said pressure sensor substantially equal to said determined intake pressure.

14. An altitude simulator for dynamometer testing, according to claim 13, wherein said pressure sensor is disposed substantially adjacent said air inlet of said internal combustion engine.

15. An altitude simulator for dynamometer testing, according to claim 12, wherein said pressure dump mechanism includes:
   a dump pressure sensor for sensing a pressure upstream of said controllable variable choke valve and for generating a dump pressure signal indicative thereof;
   a dump valve for dumping pressure from said conditioned airflow to said test site; and
   a second processor for receiving said dump pressure signal generated by said dump pressure sensor and for controlling said dump valve to maintain said pressure upstream of said controllable variable choke valve within said determined pressure range.

16. A method for conducting dynamometric testing of an internal combustion engine under a simulated atmospheric pressure, said internal combustion engine having an air inlet and an exhaust outlet, said method comprising the steps of:
   A) subjecting said air inlet to said simulated atmospheric pressure;
   B) subjecting said exhaust outlet to said simulated atmospheric pressure, comprising:
      connecting an exhaust pump to said exhaust outlet;
      measuring an exhaust pressure by positioning a pressure sensor at a location substantially adjacent said exhaust outlet;
      operating said exhaust pump to reduce said exhaust pressure measured by said pressure sensor to a pressure at least as low as said simulated atmospheric pressure;
      operating said exhaust pump to exhaust a flow from said internal combustion engine while simultaneously;
      admitting air to a location substantially adjacent said exhaust outlet, comprising the steps of:
         providing an exhaust pressure controller;
         providing a controllable inlet valve for admitting air, said controllable inlet valve being controlled by said exhaust pressure controller;
         providing signals from said pressure sensor; and
         controlling said controllable inlet valve with said exhaust pressure controller such that said exhaust pressure is maintained substantially equal to said simulated atmospheric pressure; and
   C) operating said internal combustion engine while both of said air inlet and said exhaust outlet are subjected to said simulated atmospheric pressure;
      wherein said simulated atmospheric pressure is substantially lower than said actual atmospheric pressure; and
      wherein said exhaust pump has a capacity sufficient to reduce said pressure existing at said exhaust outlet to a pressure at least as low as said simulated atmospheric pressure over substantially an entire range of operating conditions of said internal combustion engine encountered during said step C).

17. A method for conducting dynamometric testing of an internal combustion engine under a simulated atmospheric pressure, said internal combustion engine having an air inlet and an exhaust outlet, said method comprising the steps of:
   A) subjecting said air inlet to said simulated atmospheric pressure, comprising:
      providing a flow of air from said test site to said air inlet,
      providing a controllable variable choke valve for substantially restricting said flow of air,
      disposing a pressure sensor substantially adjacent said air inlet;
      measuring an intake pressure with said pressure sensor, providing an intake pressure controller;
      providing signals generated by said pressure sensor; and
      controlling said controllable variable choke valve with said intake pressure controller such that said pressure is maintained substantially equal to said simulated atmospheric pressure;
   B) subjecting said exhaust outlet to said simulated atmospheric pressure,
   C) operating said internal combustion engine while both of said air inlet and said exhaust outlet are subjected to said simulated atmospheric pressure.

18. A method for conducting dynamometric testing of an internal combustion engine under a simulated atmospheric pressure, said internal combustion engine having an air inlet and an exhaust outlet, said method comprising the steps of:
   A) subjecting said air inlet to said simulated atmospheric pressure, comprising:
      providing a flow of air to said air inlet of said internal combustion engine,
      providing an air conditioning unit for supplying a conditioned airflow to said air inlet;
      providing a controllable variable choke valve for substantially restricting said flow of air,
      measuring an intake pressure substantially adjacent said air inlet, and
      controlling said controllable variable choke valve to maintain said intake pressure substantially equal to said simulated atmospheric pressure; and
      providing a pressure dump mechanism between said air conditioning unit and said controllable variable choke valve;
      said pressure dump mechanism being operable to maintain a pressure upstream of said controllable variable choke valve within a determined pressure range;
   B) subjecting said exhaust outlet to said simulated atmospheric pressure,
   C) operating said internal combustion engine while both of said air inlet and said exhaust outlet are subjected to said simulated atmospheric pressure.

19. An altitude simulator for dynamometer testing of an internal combustion engine under a simulated atmospheric pressure, said internal combustion engine having an air inlet and an exhaust outlet, comprising:
   an exhaust pressure controller for maintaining said exhaust outlet substantially equal to a determined exhaust pressure during operation, comprising
      an exhaust pump connected to said exhaust outlet for reducing an exhaust pressure existing substantially adjacent said exhaust outlet;
      a pressure sensor positioned substantially adjacent said exhaust outlet;
      a controllable inlet valve for admitting air to a location substantially adjacent said exhaust outlet; and
      a processor for receiving signals from said pressure sensor and controlling said controllable inlet valve to maintain said exhaust pressure substantially equal to said simulated atmospheric pressure; and
   an intake pressure controller for maintaining said air inlet substantially equal to a determined intake pressure during operation;

wherein said determined exhaust pressure and said determined intake pressure are both substantially equal to said simulated atmospheric pressure; and wherein said simulated atmospheric pressure is substantially lower than said actual ambient atmospheric pressure existing at said test site.

20. An altitude simulator for dynamometer testing an internal combustion engine under a simulated atmospheric pressure, said internal combustion engine having an air inlet and an exhaust outlet, said altitude simulator for dynamometer testing comprising:

an exhaust pressure controller for maintaining said exhaust outlet to a determined exhaust pressure, and an intake pressure controller for maintaining said air inlet substantially equal to a determined intake pressure, comprising a controllable variable choke valve for substantially restricting a flow of air from said test site to said air inlet of said internal combustion engine;

an air conditioning unit for supplying a conditioned airflow to said air inlet of said internal combustion engine; and a pressure dump mechanism operationally connected between said air conditioning unit and said controllable variable choke valve;

said pressure dump mechanism being operable to maintain a pressure upstream of said controllable variable choke valve within a determined pressure range.

21. An apparatus for dynamometer testing of an internal combustion engine under a simulated atmospheric pressure, said internal combustion engine having an air inlet and an exhaust outlet, comprising:

means for maintaining said exhaust outlet substantially equal to a determined exhaust pressure during operation, comprising:

means for reducing an exhaust pressure existing substantially adjacent said exhaust outlet, means for measuring pressure at said exhaust outlet, means for admitting air to a location substantially adjacent said exhaust outlet, and means for controlling said controllable inlet valve to maintain said exhaust pressure substantially equal to said simulated atmospheric pressure, using input from said means for measuring pressure at the exhaust outlet; and means for maintaining said air inlet substantially equal to a determined intake pressure during operation.

22. An apparatus for dynamometer testing an internal combustion engine under a simulated atmospheric pressure, said internal combustion engine having an air inlet and an exhaust outlet, said altitude simulator for dynamometer testing comprising:

means for maintaining said exhaust outlet to a determined exhaust pressure, and means for maintaining said air inlet substantially equal to a determined intake pressure, comprising:

means for substantially restricting a flow of air from said test site to said air inlet of said internal combustion engine, means for supplying a conditioned airflow to said air inlet of said internal combustion engine, and means for dumping pressure operationally connected between said means for supplying a conditioned airflow and said means for substantially restricting a flow of air; wherein said means for dumping pressure is operable to maintain a pressure upstream of said means for substantially restricting a flow within a determined pressure range.

* * * * *